United States Patent [19]

Johansson

[11] Patent Number: 4,733,522

[45] Date of Patent: Mar. 29, 1988

[54] MOWER

[75] Inventor: Rolf A. G. Johansson, Partille, Sweden

[73] Assignee: Husquarna Aktiebolag, Sweden

[21] Appl. No.: 907,420

[22] Filed: Sep. 15, 1986

[30] Foreign Application Priority Data

Sep. 27, 1985 [SE] Sweden .................. 8504492

[51] Int. Cl.⁴ ............................. A01D 34/64
[52] U.S. Cl. .................... 56/17.4; 56/320.1; 56/DIG. 22
[58] Field of Search ............ 56/17.1, 17.2, 17.3, 56/17.4, 6, 7, 320.1, 320.2, 249, 252, DIG. 22, 13.6

[56] References Cited

U.S. PATENT DOCUMENTS

| 3,654,749 | 4/1972 | Ostergren et al. | 56/DIG. 22 |
| 3,759,023 | 9/1973 | Comer | 56/17.4 |
| 3,796,028 | 3/1974 | Federspiel | 56/DIG. 22 |
| 3,901,003 | 8/1975 | Erdman | 56/320.1 |
| 4,172,351 | 10/1979 | Scanland | 56/17.4 |
| 4,307,561 | 12/1981 | Hicks | 56/15.9 |
| 4,466,235 | 8/1984 | Cole | 56/320.2 |
| 4,512,144 | 4/1985 | Soldavini | 56/320.2 |
| 4,577,455 | 3/1986 | Amano et al. | 56/DIG. 22 |

Primary Examiner—Paul J. Hirsch
Assistant Examiner—Vincent Ciamacco
Attorney, Agent, or Firm—Alfred E. Miller

[57] ABSTRACT

This invention relates to a riding mower comprising a chassis supporting a driving unit intended to propell the wheels of the mower as well as a cutting attachment which is provided on the mower. The cutting attachment is movably fastened to the chassis and can by means of an operating device be brought from a lower cutting position to an upper non cutting position. The mower has a movable part shaped as a guard (58) which joins the chassis (10) and at least partially hides the cutting attachment (11) the guard being connected to the cutting attachment in order to follow its movement.

8 Claims, 3 Drawing Figures

MOWER

This invention relates to a ride-on mower comprising a chassis supporting a driving unit intended to propel the wheels of the mower as well as a front mounted cutting attachment which is provided on the mower, the cutting attachment being movably fastened to the chassis and by means of an operating device can be brought from a lower cutting position to an upper non-cutting position.

Mostly there mowers comprise a tractor shaped driving unit on which the cutting attachment is secured. The cutting attachment is usually provided with several details extending at the outside, for instance bars for adjusting the cutting height, bars for connecting the cutting attachment with the driving unit, wheels supporting the cutting attachment and so on. These extending parts often hinder the movement of the mower since they easily hook into bushes, branches and flowers. Further, lawn mowers of the ride-on type do not offer a very high degree of safty against injuries although certain minimum demands are fulfilled with respect to the safety regulations in different countries. Thus, it is for instance known to attach a vertical steel plate of limited height at the outside of the cutting attachment and at a distance from it in order to prevent a foot from being lacerated by the cutter blade. This steel plate also serves as a means to prevent objects from being ricocheted out horizontally. However, it will not prevent loose objects from being thrown out between the cutting attachment and the chassis. On the contrary, the arrangement can cause a ricochet which is directed upwards against the operator. The previously known machines have not been particularly designed in order to reduce the noise level which, to a large extent is created by the cutting attachment.

This invention offers certain advantages with respect to the prior art mowers.

Thus, according to the invention, the shape which the machine has, i.e. a smooth front part, makes it possible to drive the machine close to bushes and flowers without breaking or destroying them. This shape also assists in giving the machine an attractive appearance. Further, upwardly directed ricochets are effectively eliminated since the guard which is connected to the cutting attachment is a direct continuation of the chassis. Because of this design the device also serves as a sound barrier for cutting noise.

An embodiment of the invention will now be described with reference to the accompanying drawings where FIG. 1 is a schematic vertical section of a device according to the invention.

Figure 1:
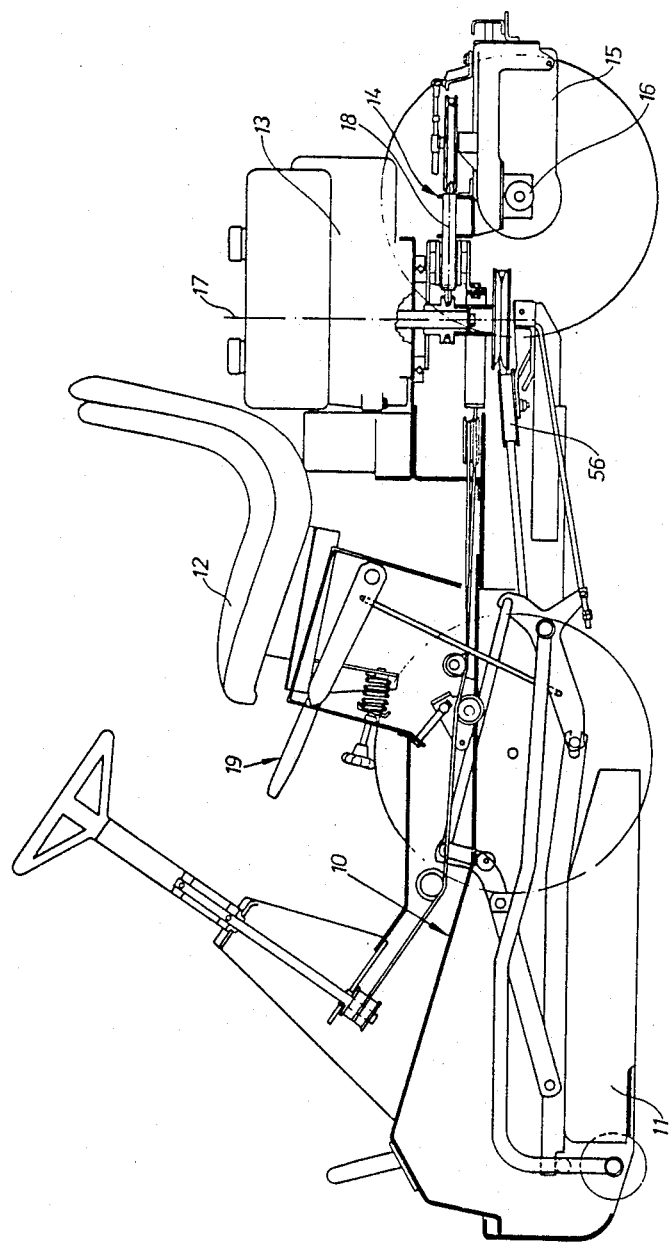

As appears from the figures the mower comprises a front chassis section 10 supporting a cutting attachment 11, a seat 12, and a driving unit 13, and a rear chassis section 14 supporting a gear box 15 and a rear shaft 16. The front and the rear section are pivotally connected to each other and can be turned about a common vertical axis 17. Moreover the rear section is so designed that it can swing about a horizontal axis 18. At the seat there is a bar 19. The bar acts on the cutting attachment 11 by means of a link arm mechanism described below so that it can be positioned in different cutting heights as well as be moved from a cutting to a non cutting position.

Figure 3:
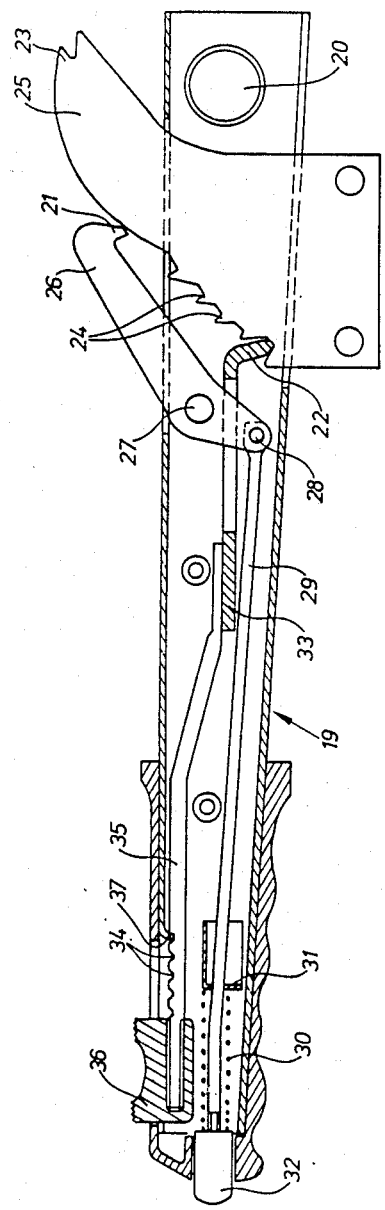
FIG. 3 is a section of the operating device.

The bar 19 as seen in FIG. 3, can be turned about a dowel 20 and comprises two hooks 21 and 24 respectively which can be brought into engagement with teeth 23 and 24 respectively on a plate 25 fixed to the chassis. The hook 21 is placed at one end of a rocker arm 26 which turns about a dowel 27 which is fixed to the bar 19. The other end of the rocker arm is at a point 28 turnably connected to a rod 29 which is under the influence of a spring 30. The spring in turn pushes the hook 21 towards the plate 25. The spring is clamped between a bracket 31 on the bar 19 and a knob 32 screwed to the rod. Thus, by means of the knob 32, the hook 21 can be acted on so that it disengages from the tooth 23.

The hook 22 is a bent outer part of a plate 33 which continues into a slide 35 which is provided with several recesses 34, the slide being movable in the direction of the bar by means of a knob 36. The slide 35 can be locked in certain positions since a tongue 37 on the bar 19 engages anyone of the recesses 34. Thus, by means of the knob 36, the hook 22 can be positioned so that it engages a suitable tooth 24.

The bar which is placed at one side of the chassis is by means of a drawbar 38 connected to a three arm follower 39 which is connected to a shaft 40 which is turnably fastened to the chassis. On the opposite side of the chassis this shaft supports another follower (not shown) intended to act on the type of link arm mechanism which will be described hereinafter.

The shaft 40 also supports a mainly U-shaped yoke 41 comprising two parallel pipes 42 placed one on each side of the cutter attachment. These pipes are turnably fastened to the shaft 40. The pipes have a horizontal inner part and a vertical outer part and are via a pipe 43 connected to each other, the pipe 43 serving as a bearing for several rollers 44 which are intended to rest on the ground during cutting.

The pipes 42 each have an ear 45 to which an angled link arm 46 is turnably fastened. One end of the link arm 46 supports a draw bar 47 the other end of which is connected to a first arm 48 of the three arm follower 39. The other end of the link arm 46 is turnably fastened to a lever 49 extending between the vertical part of the pipe 42 and a second arm 50 of the follower 39. The end of the link arm 46 which is in touch with the pipe 42 is shaped as a fork 51 and intended to slide on the pipe whereas its second end has a slot 52 in which a dowel 53 of the second arm 50 slides. The third arm 545 of the follower is via a drawbar 55 connected to a tension roller 56 (FIG. 1) in order to act on a belt, (not shown) in detail running between the driving unit and the cutting attachment.

The yoke 41 has at its front part a fastening means 57 by means of which a guard 58 preferably of plastics is fastened to the yoke. The guard is mainly U-shaped as seen in a horizontal projection, and covers the front side of the cutting attachment as well as its sides. The sides of the guard extend to the front wheels which means that there is formed a protected zone about the major part of the cutting attachment. The upper part of the guard is placed closely outside a front plate 59 under which the cutting attachment is situated and has a flange 60 which in a lower position engages the flange 61 on the the steel plate 59. This flange can however by avoided since it will otherwise prevent the tilting movement of the guard, for instance when passing a curb kerb. At the lower part of the guard there is at its front end an opening 62 which means that small objects do not hinder the movement of the mower. At the lower side part of the guard and at its inside there is a pipe 63 which is fixed to the guard. This pipe is bent and turnably fastened to the pipe 43 by means of the fastening means 57 which means that the guard follows the movement of the rollers on the ground during cutting. The fastening means 57 also supports a turning stop 64 keeping the guard parallel to ground by cooperation with the stay 65 extending between the vertical parts of the pipe 42. Since the guard joins directly to the front part of the chassis the mower gets a very smooth front part at the same time as stones or the like are prevented from being thrown out between the cutting unit and the chassis, thereby also creating an interconnected sound barrier.

The cutting attachment has several pulleys 66 each driving a cutter blade in the cutter attachment and the chassis has a corresponding number of braking rubber blocks 67. These blocks are placed so that they engage the pulleys when the cutting attachment is swung to its inactive upper position that is the dash dotted position shown in FIG. 2. These blocks also are a spring support for the cutting attachment in its upper position by means of which rattling and noise is avoided when the mower is driven.

The device operates in the following way.

In its disconnected position the bar 19 is mainly vertical and the hook engages the tooth 23 of the plate 25. In order to set the cutting height in a suitable position the knob 36 is depressed which means that the slide 35 disengages from tongue 37 so that it can be moved in the direction of the bar. Then the hook 22 is also moved in the length direction of the bar so that the hook 22 when moving the bar forwards downwards in FIG. 2 engages one of the teeth 24 of the plate 25 thereby preventing the bar 19 from being moved further forwards. For moving the cutting attachment to a cutting position the hook 21 is moved out of engagement with the tooth 23 by acting on the knob 32.

Figure 2:
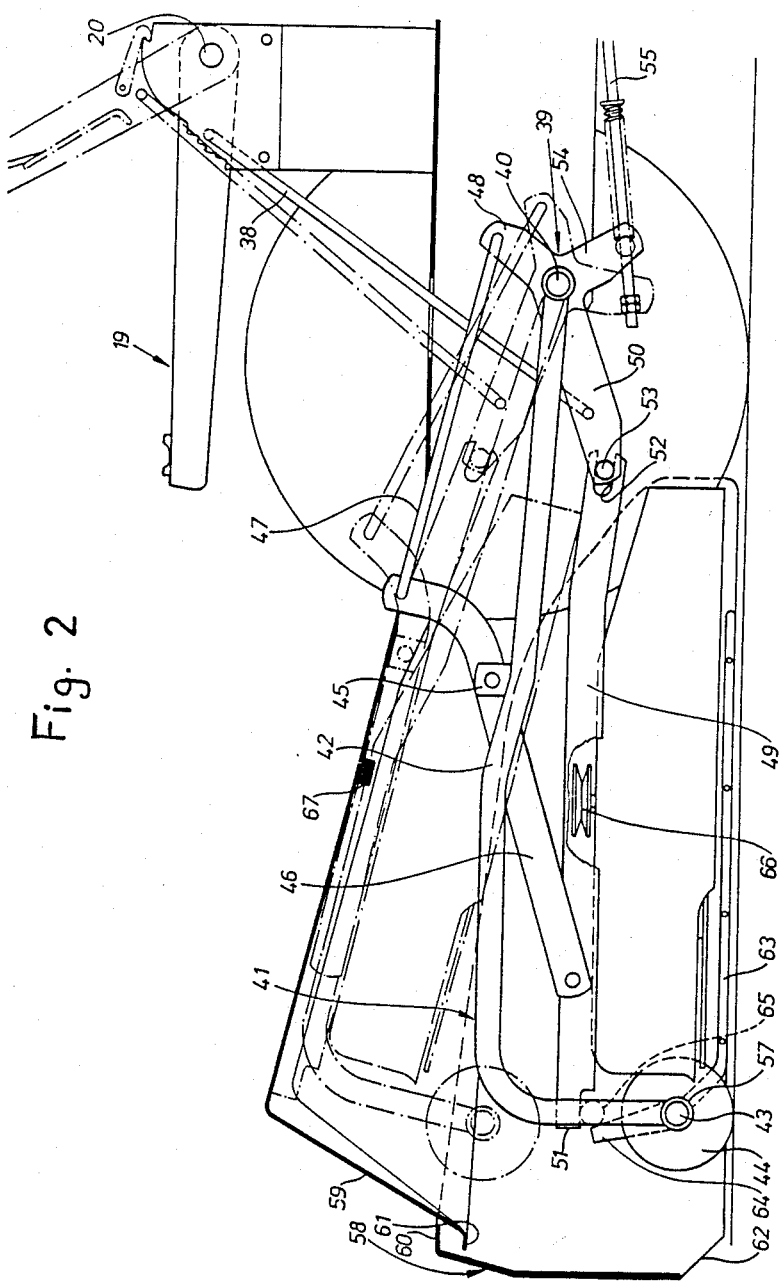
FIG. 2 is a vertical section of the support of the cutting attachment.

When the bar disengages, it will, because of the weight of the cutting attachment, be folded forwards which means that the drawbar 38 turns the follower couterclockwise in FIG. 2. This movement means that the lever 49 disengages and can be moved downwards in the figure. The yoke 41 which in the original position with its front part rests on the fork 51 of the lever 49 thereby turns about the shaft 40 until the rollers 44 engage the ground. Further movement forwards of the bar 19 now means that the lever 49 with the cutter attachment fastened to it is moved straight downwards in the figure under the influence of the link arm 46, drawbar 47 and follower 39 at the same time as the fork 51 is moved along the vertical part of the pipe 42. The downward movement of the bar is then stopped by the hook 22 in the way which has been described above. The guard 58 which is directly connected to the yoke 41 of course follows the movement described above. At the same time the belt drive (not shown) of the cutting attachment is engaged because the tension roller connected to the drawbar 55 tensions the belt between engine and cutting attachment.

The preset cutting height is maintained by means of the rollers 44 and any ridges or recesses of the lawn causing a corresponding increase or decrease of the cutting height depending on that the rear part of the lever 49 is kept at a certain distance from the ground whereas the front part of the lever is subject to the changes of the ground level.

In order to increase the cutting height during movement for instance when passing an obstacle, the bar 19 is drawn upwards in FIG. 2 which causes the cutting attachment to be lifted straight upwards. When the obstacle has been passed it is possible to return to the original cutting height by releasing the bar so that is returns to the original position. If a more permanent change of the cutting height is desired the knob 36 is moved in a way which has been described above before the bar 19 is again released.

In the manner described above a parallel movement of the cutting attachment is achieved for setting of the different cutting heights in the lower region of the moving path of the cutting attachment whereas this movement at the upper region of the moving path of the cutting attachment continues into a turning movement.

I claim:

1. A riding mower comprising a chassis, a driving mechanism for the wheels of said mower, a front mounted cutting attachment provided on said mower and having rollers thereon, said cutting attachment having at least one cutting blade and a casing surrounding said cutting blade, means including an operating device for movably fastening said cutting attachment to said chassis and for moving said cutting attachment from a lower cutting position to an upper noncutting position and vice versa, the front part of said chassis being shaped as a protective hood covering the cutting attachment when it is in said lower position supported by said rollers, a guard enclosing the cutting attachment and said rollers and located in front of and spaced from said casing, said guard being secured to the front part of said chassis and following the movement of said cutting attachment so that loose objects in the path of movement of the cutting blade of said mower will be deflected harmlessly.

2. A riding mower as claimed in claim 1 wherein said guard is U-shaped.

3. A riding mower as claimed in claim 2 wherein the legs of said U-shaped guard extend from the front part of said chassis to the front wheels of said mower.

4. A riding mower as claimed in claim 1 wherein the front part of said guard at its lower edge is provided with an opening which extends substantially over the complete cutting width of said cutting blade.

5. A riding mower as claimed in claim 1 wherein said means mounting said cutting attachment further comprises means for fastening said rollers thereto, and said guard being connected to said last mentioned means.

6. A riding mower as claimed in claim 5 wherein said rollers are located at the front part of said guard, and said mounting means for said cutting attachment being provided with a shaft on which said rollers are rotatably fastened and about which said guard can turn.

7. A riding mower as claimed in claim 6 wherein said guard is provided with a stop means, and abutting surface for said stop means on said mounting means for said cutting attachment in order to prevent the rear part of said guard from engaging the ground.

8. A riding mower as claimed in claim 1 wherein said guard is fabricated of a plastic material.

* * * * *